United States Patent
Aida et al.

[11] Patent Number: 6,138,181
[45] Date of Patent: Oct. 24, 2000

[54] CPU MODE SWITCHING CIRCUIT CHANGING OPERATION MODE RESPONSIVE TO A POWER ON RESET SIGNAL AND AN EXTERNAL RESET SIGNAL

[75] Inventors: Yoshihisa Aida; Itoh Keiichi, both of Tokyo, Japan

[73] Assignee: Oki Electric Industry Co., Ltd., Tokyo, Japan

[21] Appl. No.: 09/150,740

[22] Filed: Sep. 10, 1998

[30] Foreign Application Priority Data

Sep. 12, 1997 [JP] Japan ..................................... 9-267787

[51] Int. Cl.$^7$ ........................................................ G06F 13/00
[52] U.S. Cl. ................................ 710/11; 710/10; 710/14; 710/105
[58] Field of Search ............................... 710/11, 105, 10, 710/14

[56] References Cited

U.S. PATENT DOCUMENTS

| 5,168,151 | 12/1992 | Nara ........................................ 235/492 |
| 5,349,649 | 9/1994 | Lijima ...................................... 395/275 |
| 5,517,460 | 5/1996 | Yamaguchi ............................... 365/233 |
| 5,581,708 | 12/1996 | Lijima ................................. 395/200.14 |
| 5,664,157 | 9/1997 | Takahira et al. ........................ 235/491 |
| 5,758,121 | 5/1998 | Fukuzumi ................................ 713/300 |
| 5,798,507 | 8/1998 | Kawagishi et al. ..................... 235/380 |
| 5,979,759 | 11/1999 | Ohta et al. ............................... 235/441 |

FOREIGN PATENT DOCUMENTS

0513507A1  11/1992  European Pat. Off. ....... G06K 19/07

*Primary Examiner*—Ayaz R. Shelkh
*Assistant Examiner*—Tim Vo
*Attorney, Agent, or Firm*—Jones Volentine, L.L.C

[57] ABSTRACT

A CPU mode switching circuit without a mode switching terminal includes a power on reset circuit generating a power on reset signal when circuit power is turned on, a reset signal generating circuit coupled to the power on reset circuit for receiving the power on reset signal and an external reset signal terminal for receiving an external reset signal. The reset signal generating circuit outputs an internal reset signal in response to the received signals. The CPU mode switching circuit further includes a CPU mode selector having operation mode data as internal data thereof and a CPU coupled to the CPU mode selector and the reset signal generating circuit. The CPU mode selector resets the internal data in response to the power on reset signal. The CPU changes the operation mode according to the internal data of the CPU mode selector when the CPU receives the internal reset signal. Then, the CPU rewrites the internal data of the CPU mode selector.

16 Claims, 4 Drawing Sheets

CPU MODE SWITCHING CIRCUIT CHANGING OPERATION MODE RESPONSIVE TO A POWER ON RESET SIGNAL AND AN EXTERNAL RESET SIGNAL

BACKGROUND OF THE INVENTION

1. Field of the Invention

The present invention relates to a CPU mode switching circuit, particularly a CPU mode switching circuit enabling a CPU to be switched to a plurality of operation modes without adding a new terminal for switching the mode by utilizing an already existing input terminal.

2. Description of the Background Art

In general, a CPU can be operated in a plurality of operating modes and needs a proper mode switching to comply with an operation environment. For example, when a CPU is built in an IC card, a communication protocol of the IC card must fit in with that of a reader/writer, or reading/writing equipment of IC card for a good data communication. Accordingly, if the communication protocol of the IC card can be changed by switching the operation mode of the built-in CPU, the IC card can be applied to more number of readers/writers.

In order to switch a CPU operation mode for a certain purpose like corresponding to a plurality of communication protocols as described above, it is usual that a mode selecting signal is newly input to the IC card from the outside for selecting the CPU mode after reset besides an existing reset signal for resetting the CPU. In other words, the function of switching operation mode of the built-in CPU can be ensured by providing the IC card with a new input terminal for a CPU mode selecting signal in addition to existing terminals for power supply, grounding, data input/output and reset.

However, an IC card is usually thin and has only the minimum number of input/output terminals like 6 or 8 for example. It is not preferable to increase a terminal under such condition for allocating the CPU mode selecting signal besides basic input/output signals for the IC card, considering future possible expansion of terminals. If two operation modes are necessary, only one terminal is additionally necessary for the mode selecting signal. But if more operation modes are necessary, more terminals come to necessity, which may result in difficulty in keeping a thin form of the IC card.

Another problem is that a circuit generating the mode selecting signal is necessary to be added in a reader/writer connected to the IC card. Expansion of reader/writer's circuit and cost-up by this can not be prevented.

SUMMARY OF THE INVENTION

It is an object of this invention to provide a new and improved CPU mode switching circuit to solve the above-mentioned problems.

In order to accomplish the foregoing object, a CPU mode switching circuit according to the present invention comprises a power on reset circuit generating a power on reset signal when a power is turned on, a reset signal generating circuit coupled to the power on reset circuit for receiving the power on reset signal and an external reset signal. The reset signal generating circuit outputs an internal reset signal in response to the received signals. The CPU mode switching circuit further comprises a CPU mode selector having operation mode data as internal data thereof and a CPU coupled to the CPU mode selector and the reset signal generating circuit. The CPU mode selector resets the internal data in response to the power on reset signal. The CPU changes the operation mode according to the internal data of the CPU mode selector when the CPU receives the internal reset signal. Then, the CPU rewrites the internal data of the CPU mode selector.

DETAILED DESCRIPTION OF THE PREFERRED EMBODIMENTS

Referring to attached drawings, a CPU mode switching circuit according to a preferred embodiment of the present invention is described below. The CPU mode switching circuit according to an embodiment of the present invention includes a power-on reset signal output circuit 3 working as a first-reset-signal outputting part, an external reset signal input terminal 5 working as a second-reset-signal inputting part, a CPU mode selector 7 working as a selector and a CPU reset signal output circuit 9.

The circuit 3 outputs a power-on reset signal S3 working as a first reset signal. The signal S3 is designed to be commonly distributed to a reset input terminal R of the selector 7 placed after the circuit 3 and to the output circuit 9. An external reset signal S5 which is input from the terminal 5 is input to the circuit 9. The circuit 9 outputs a CPU reset signal S9 to a CPU 11 in order to reset the CPU 11, upon receipt of either the signal S3 from the circuit 3 or the signal S5 from the terminal 5. The circuit 9 can be constructed with OR gates but may incorporate a delay circuit so as to adjust output timing of the signal S9, namely reset timing of the CPU 11.

Figure 2:
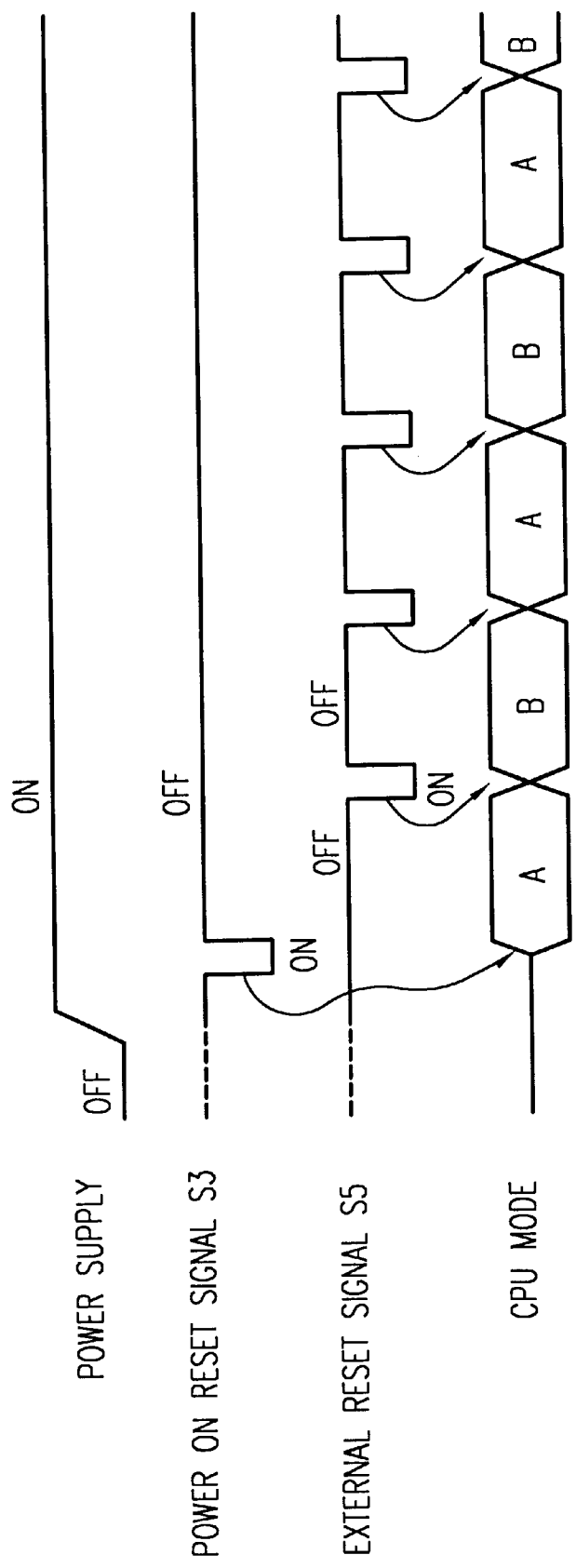
FIG. 2 is a timing chart showing an operation of a CPU mode switching circuit shown in FIG. 1.

A data input/output terminal I/O of the selector 7 is connected to the CPU 11 through a data bus 13. An internal data in the selector 7 can be read out and written in by the CPU 11. In the embodiment of the present invention disclosed below, an example of switching two operating modes of the CPU 11 is described. In this case, the internal data of the selector 7 is 1 bit. An operation of the circuit 1 according to this embodiment of the present invention is described below As shown in FIG. 2, the circuit 3 outputs the signal S3 for the duration of predetermined time when power is turned on. The circuit 9 outputs, upon receipt of the signal S3, the signal S9 to reset the CPU 11. The signal S3 is also input to the terminal R of the selector 7 to reset the internal data of the selector 7, namely reset it to "0".

The CPU 11 reads out the internal data from the terminal I/O through the data bus 13. At this moment, the internal data is already set to "0" by the signal S3 as described above. When recognizing the internal data "0", the CPU 11 is set to an operating mode A and rewrites the internal data from "0" to "1". In the case, it is defined in advance that the CPU 11 is set to the mode A when the CPU 11 reads out the internal data "0". The CPU 11 starts an operation in the mode A after the above-mentioned initial setting is finished.

Figure 3:
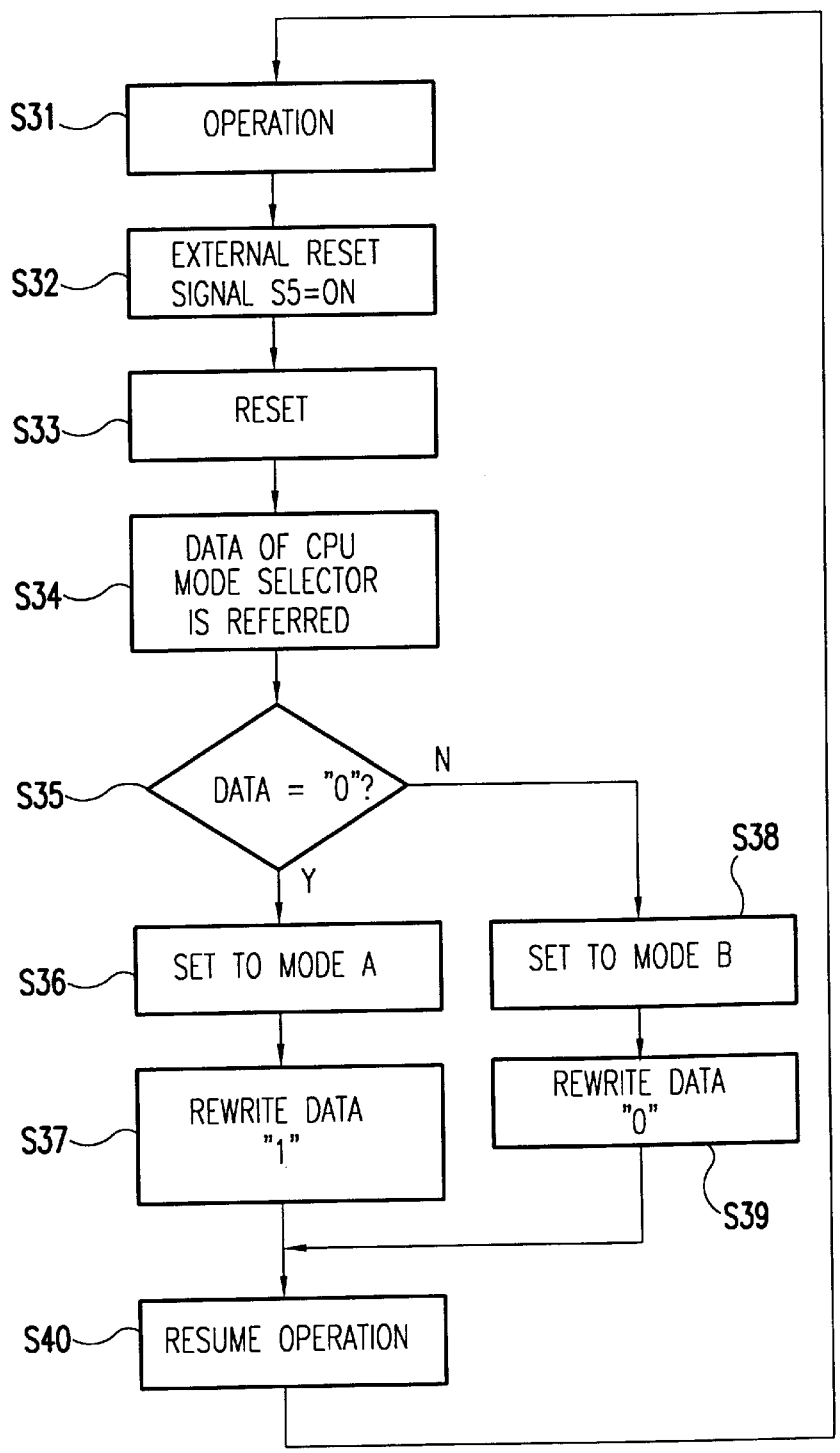
FIG. 3 is flow chart showing an operation of a CPU mode switching circuit shown in FIG. 1.

Then, as shown in FIG. 3, if the signal S5 is, while the CPU 11 is carrying out the operation(S31), input to the circuit 9 from the terminal 5 (S32), the circuit 9 outputs the signal S9 to reset the CPU 11 (S33). The CPU 11 reads out the internal data from the terminal I/O through the data bus 13 (S34) and judges a value of the internal data (S35). If the internal data is "0", the CPU 11 is set to the mode A (S36) and rewrites the internal data from "0" to "1" (S37). If the internal data is "1", the CPU 11 is set to an operation mode B (S38) and rewrites the internal data from "1" to "0" (S39). In the case, it is defined in advance that the CPU 11 is set to the mode B when the CPU 11 reads out the internal data "1".

As described above, the CPU 11 is, when reset by the signal S5, switched to an operation mode which is opposite to an operation mode working just before the signal S5 is input, and then resumes operation (S40). For example, if the signal S5 is input to the CPU 11 during the operation in the mode A, the CPU 11 resumes the operation in the mode B. To the contrary, the CPU 11 operating in the mode B is switched to the mode A by the signal S5. As shown in FIG.2, the CPU 11 always starts its operation from the mode A when power is turned on and is switched to the mode B by the first signal S5. Afterwards, the CPU 11 is switched to the mode A and the mode B in turn every time the signal S5 is input.

Thus, the circuit 1 having structure and function described above enables the operation mode of the CPU 11 to be switched by the signal S5 supplied from the already existing terminal 5. It is not necessary to additionally provide a signal input terminal for the purpose of selecting the mode of the CPU 11. Also it is not necessary to provide a separate interrupt circuit because the internal data in the selector 7 is so designed to be written in and read out by the CPU 11 through the data bus 13.

In this embodiment, an example of two operation modes of the CPU 11 is referred, however, the number of the mode can be increased by allocating a plurality of bits to the internal data in the selector 7. An operation of the CPU 11 in case two bits are allocated to the internal data is described below.

Figure 1:
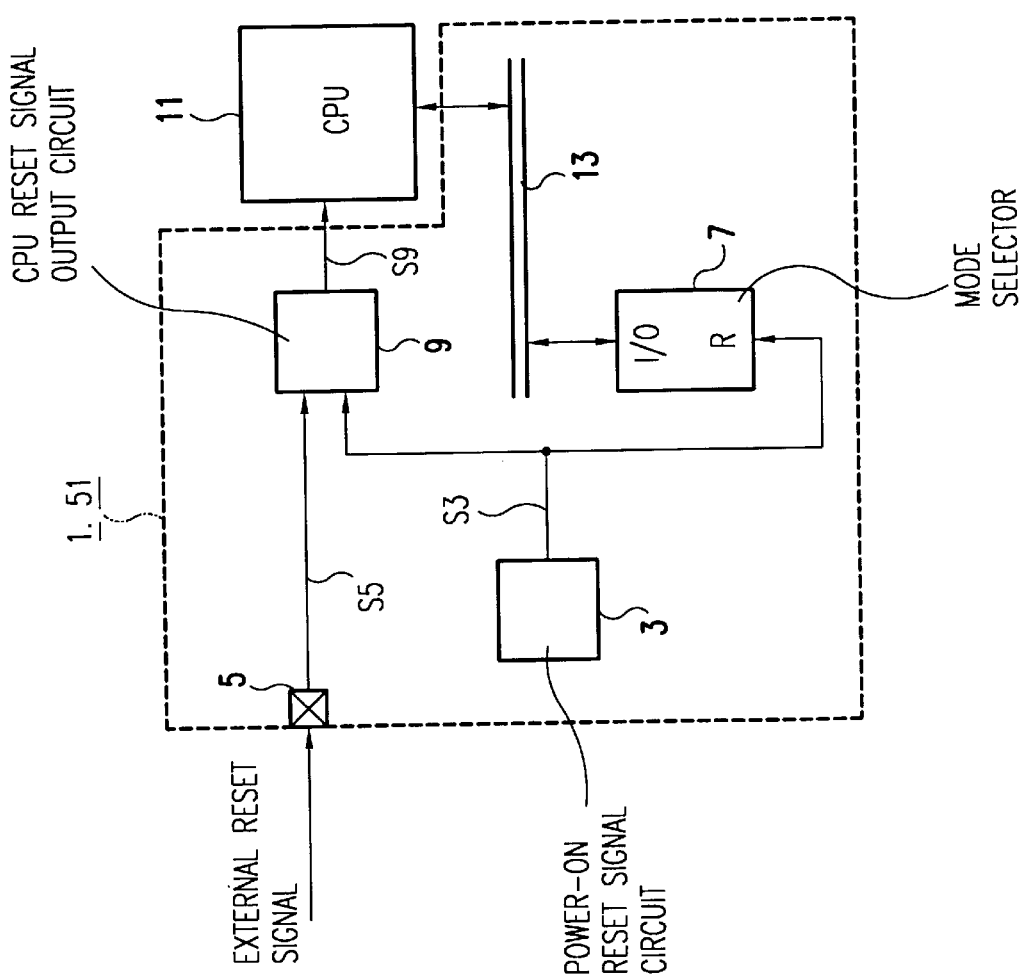
FIG. 1 is a block diagram showing an outline of a CPU mode switching circuit according to an embodiment of the present invention.

A mode switching circuit 51 according to another embodiment of the present invention has the quite same function and structure as the circuit 1, as shown in FIG. 1, with only one exception of the number of bit. Accordingly, the same numbering is used in order to avoid repeat of the same description.

Figure 4:
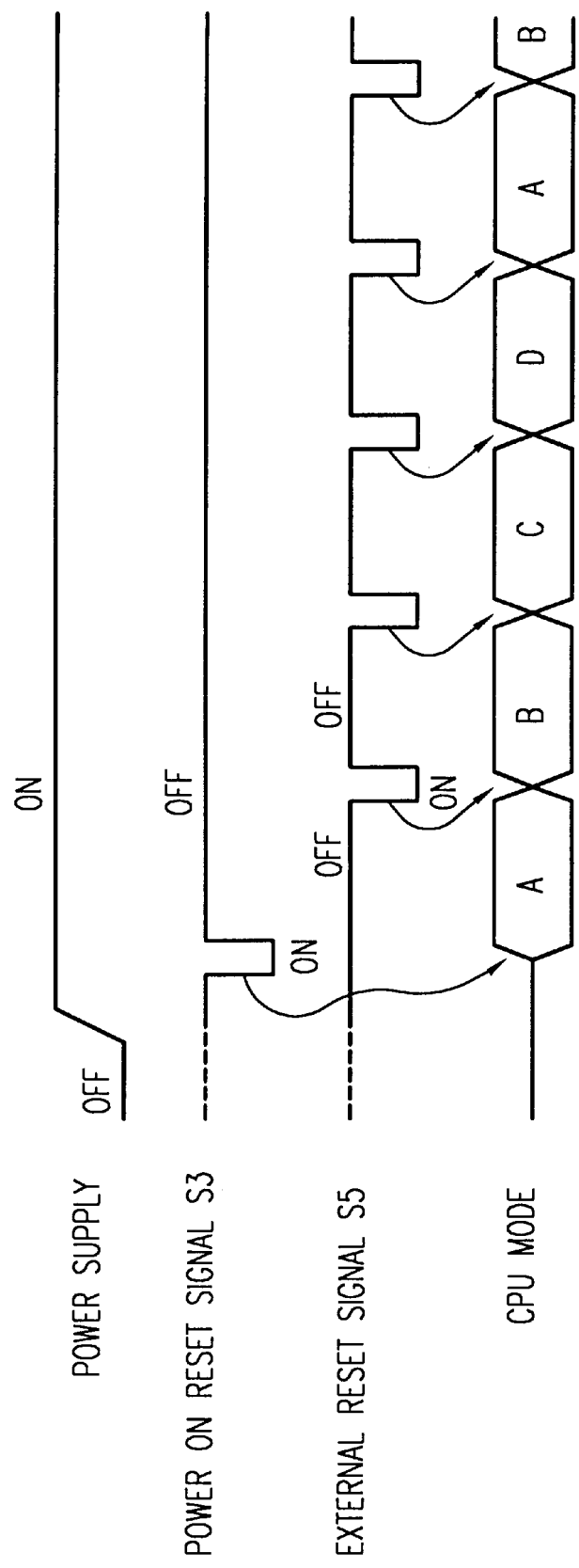
FIG. 4 is a timing chart showing an operation of a CPU mode switching circuit according to another embodiment of the present invention.

As shown in FIG. 4, the circuit 3 outputs, when power is turned on, the signal S3 for the duration of pre-determined time. The circuit 9 outputs, upon receipt of the signal S3, the signal S9 to reset the CPU 11. The signal S3 is also input to the terminal R of the selector 7 to reset the internal data in the selector 7, namely reset it to "00". The CPU 11 reads out the internal data from the terminal I/O through the data bus 13. At this moment, the internal data has been already set to "00" by the signal S3 as described above. When recognizing the internal data "00", the CPU 11 is set to the mode A and rewrites the internal data "00" to "01" by adding "1". The CPU 11 starts the operation in the mode A after the above-mentioned initial setting is finished.

If the signal S5 is, while the CPU 11 is carrying out the operation, input to the circuit 9 from the terminal 5, the circuit 9 outputs the signal S9 to reset the CPU 11. The CPU 11 reads out the internal data in the selector 7 from the terminal I/O through the data bus 13 and judges a value of the internal data. At the moment, the internal data has been already set to "01" by the initial setting described above. The CPU 11 is set to the mode B by the internal data "01" and rewrites the internal data "01" to "10" by adding "1". Then, the CPU 11 starts the operation in the mode B. If the signal S5 is, while the CPU 11 is carrying out the operation in the mode B, input from the terminal 5 again, the CPU 11 is reset in the same way as before. The CPU 11 reads out the internal data in the selector 7 from the terminal I/O through the data bus 13 and judges a value of the internal data. At the moment, the internal data has been already set to "10" as described above. The CPU 11 is set to an operation mode C for example by the internal data "10" and rewrites the internal data "10" to "11" by adding "1". After that, the CPU 11 starts an operation in the mode C.

If the signal S5 is input, while the CPU 11 is carrying out the operation in the mode C, the CPU 11 is reset, rewrites the internal data "11" to "00", switches the mode C to an operation mode D for example and starts operation in the mode D. If the signal S5 is further input, while the CPU 11 is carrying out the operation in the mode D, the CPU 11 switches the mode D to the mode A, which is the same as the first mode just after power-on, because the internal data is "00". As fully described above, the circuit 51 according to the another embodiment of the present invention can give a plurality of modes to the CPU 11 since a plurality of bits are allocated to the internal data in the selector 7. The operation mode of the CPU 11 is switched in pre-determined order since the internal data in the selector 7 is increased by "1" everytime the reset signal S5 is input. The maximum number of modes of the CPU 11 can be increased to two, four and eight simply by changing the bit allocated to the internal data from 1 to 2 and 3.

If the circuit 1 or 51 is applied to the IC card described before, an operating mode of the CPU built in the IC card can be switched by a reset signal input from an ordinarily provided reset terminal. It is not necessary to add a terminal for the purpose of selecting the operation mode of the CPU. Moreover, the operation mode can be easily increased. If more communication protocols are designed to be selected by switching the mode, the IC card can correspond to more readers and writers.

The present invention is not limited to the preferred embodiments described above. A professional would obviously think of a variety of changes and modifications within the category of the technical idea disclosed in the claims. It is believed that such changes and modifications belong to the technical range disclosed in the present invention. For example, the IC card is referred to as an application example of the circuits 1 and 51. However, the circuits 1 and 51 can be applied to any devices that have a built-in CPU and limits to number of input/output ports but must correspond to a plurality of systems.

What is claimed is:

1. A CPU mode switching circuit switching a plurality of operation modes, comprising:
   a power on reset circuit generating a power on reset signal when a power is turned on;
   a reset signal generating circuit coupled to said power on reset circuit for receiving the power on reset signal and an external reset signal and outputting an internal reset signal in response to the reset signals;
   a CPU mode selector having a plurality of operation mode data as internal data thereof, said CPU mode selector resetting the internal data in response to the power on reset signal; and a CPU coupled to said CPU mode selector and said reset signal generating circuit, said CPU changing an operation mode according to the internal data of said CPU mode selector when said CPU receives the internal reset signal, said CPU rewriting the internal data of said CPU mode selector after the operation mode is changed.

2. A CPU mode switching circuit according to claim 1, wherein said reset signal generating circuit includes an OR circuit.

3. A CPU mode switching circuit according to claim 1, wherein said reset signal generating circuit includes a delay circuit to adjust output timing of the internal reset signal.

4. A CPU mode switching circuit according to claim 1, wherein the internal data of said CPU mode selector is read out and rewritten by said CPU through a data bus.

5. A CPU mode switching circuit according to claim 1 which is located on an IC card.

6. A CPU mode switching circuit according to claim 1, wherein said reset signal generating circuit comprises a reset input terminal for receiving the external reset signal.

7. A method of switching CPU modes of a CPU comprising:
   resetting an internal data of a CPU mode selector to a predetermined one of a plurality of operation mode data when a power is turned on;
   reading the internal data of the CPU mode selector when an external reset signal is received;
   changing an operation mode of the CPU in accordance with the read internal data; and
   rewriting the internal data of the CPU mode selector to a next one of the operation mode data, the operation mode data having a cyclic sequence.

8. A method of switching CPU modes according to claim 7, wherein the operation mode data are "0" and "1."

9. A method of switching CPU modes according to claim 7, wherein the operational data include 4-bit data.

10. A method of switching CPU modes according to claim 7, further comprising resetting the CPU in response to the external reset signal.

11. A CPU mode switching circuit changing a plurality of operation modes of a CPU, comprising:
   a power on reset circuit generating a power on reset signal in response to a power turn-on;
   a reset signal generating circuit outputting an internal reset signal in response to the power on reset signal and an external reset signal; and
   a CPU mode selector storing operation mode data, said CPU mode selector resetting the stored operation mode data in response to the power on reset signal,
   the CPU changing the operation mode according to the stored operation mode data of said CPU mode selector in response to the internal reset signal and rewriting the stored operation mode data of said CPU mode selector after the operation mode is changed.

12. A CPU mode switching circuit according to claim 11, wherein said reset signal generating circuit includes an OR circuit.

13. A CPU mode switching circuit according to claim 11, wherein said reset signal generating circuit includes a delay circuit to adjust output timing of the internal reset signal.

14. A CPU mode switching circuit according to claim 11, wherein said stored operational mode data of said CPU mode selector is read out and rewritten by the CPU through a data bus.

15. A CPU mode switching circuit according to claim 11 which is located on an IC card.

16. A CPU mode switching circuit according to claim 11, wherein said reset signal generating circuit comprises a reset input terminal for receiving the external reset signal.

* * * * *